United States Patent [19]

Mombächer

[11] 4,036,405
[45] July 19, 1977

[54] INJECTION MOLDING MACHINE WITH FEED CONTROL

[75] Inventor: Ingolf Mombächer, Reinfeld, Germany

[73] Assignee: Braas & Co. GmbH, Frankfurt am Main, Germany

[21] Appl. No.: 543,959

[22] Filed: Jan. 24, 1975

[30] Foreign Application Priority Data

Nov. 19, 1973 Germany .............................. 2357583

[51] Int. Cl.² .............................................. B29F 1/06
[52] U.S. Cl. ..................................... 222/63; 222/334; 425/146; 425/568
[58] Field of Search ............ 267/126, 65 D; 425/146, 425/242 R, 245 NS, 376, 317 R; 222/252, 255, 378, 334, 409, 488, 492–495, 559, 63

[56] References Cited

U.S. PATENT DOCUMENTS

| | | |
|---|---|---|
| 3,248,879 | 3/1966 | Natho .............................. 267/65 D |
| 3,308,994 | 3/1967 | Rohn ................................. 222/227 X |
| 3,628,901 | 12/1971 | Paulson ............................ 425/242 R |
| 3,685,937 | 8/1972 | Engel ................................ 425/242 R |
| 3,891,126 | 6/1975 | Segawa ................................. 222/334 |
| 3,924,994 | 12/1975 | Aoki ................................ 425/242 R |

*Primary Examiner*—Robert B. Reeves
*Assistant Examiner*—David A. Scherbel
*Attorney, Agent, or Firm*—Toren, McGeady and Stanger

[57] ABSTRACT

An injection molding machine comprising an injection cylinder; a displacement element axially disposed in the injection cylinder; one of the cylinder and displacement element being movable with respect to the other; an injection nozzle on one end of the injection cylinder and a feed device including a feed hopper and a plunger reciprocally mounted in the hopper on the other end of the cylinder; a pressure source for driving the plunger; and switches for varying the working position of the plunger, the plunger stroke, the stroke frequency of the plunger and the pressure of the pressure medium.

4 Claims, 2 Drawing Figures

INJECTION MOLDING MACHINE WITH FEED CONTROL

SUMMARY OF THE INVENTION

The invention relates to an injection molding machine for plastic material.

More specifically, the invention relates to an injection molding machine including an injection cylinder with a displacement element axially disposed therein. One of the cylinder and displacement element is movable in a longitudinal direction with respect to the other, and an injection nozzle is arranged on one end of the injection cylinder.

A feed device with a feed hopper and a plunger reciprocally mounted therein is provided on the other end.

In a known injection molding machine of the above type (see German Patent Publication No. 2,010,151) the plunger is driven mechanically by means of an eccentric press. Since various thermoplastic materials having different viscosities and thermal conductivities are used as injection molding materials, it has become apparent that a machine having a mechanically driven feed rod or plunger cannot be adapted to the processing of the different thermoplastic materials in a satisfactory manner.

The object of the present invention is to provide a solution to the above problem by adapting the operation of the plunger, within wide limits, to the properties of thermoplastic materials, particularly to their viscosity and thermal conductivity.

In an injection molding machine of the type described hereinbefore, the problem is solved by driving the plunger using a pressure medium, preferably a hydraulic medium. The operating position of the plunger, the plunger strokes, the stroke frequency and the pressure of the pressure medium are variable. Thus, operation of the plunger can be adapted, in various ways, to the particular properties of a plastic material, for example, to liquefy a highly viscous material with many small, hard impacts at high dynamic pressure, whereas a low-viscosity material can be better processed with a few large, soft strokes and at low dynamic pressure.

A particularly simple and suitable embodiment is obtained if two switches determining the final position of the plunger are assigned to a pressure cylinder which drives the plunger. The switches are independently adjustable in the longitudinal direction of the cylinder and control a two-way valve for reversing the flow of pressure medium to the cylinder. As will be apparent, both the operating position of the plunger, i.e., its nul point, and the extent of the plunger stroke are thus adjustable in a relatively simple manner in that the two switches determining the two final positions of the plunger can be adjusted, i.e., relocated. At the same time, the stroke frequency is adjustable in a simple manner if the volume of pressure medium supply to the cylinder is maintained so that upon changing the plunger stroke a correspondingly reciprocal change of the stroke frequency is effected.

Resetting of the plunger using a pressure medium reservoir further contributes to simplification of the hydraulic system.

Moreover, it is recommended that the machine be such that the pressure medium discharged from the pressure medium reservoir is returned to the reservoir. Thus, proper cooling of the pressure medium can be effected.

If, during resetting of the plunger, the pressure medium conveyed by a pump is returned to the reservoir by way of a two-way valve, which is also controlled by the switches controlling plunger operation, a further contribution is made to the cooling of the pressure medium.

In order to adjust the pressure of the pressure medium, an adjustable pressure relief valve may be installed in a branch of the pressure medium line between the pump and the pressure cylinder. Use of non-contact switches, particularly magnetic switches, is preferred.

It has also been found to be very advantageous to stop the plunger during extrusion of the material from the injection cylinder. This is possible in a particularly simple manner if the plunger is operated using a pressure medium.

BRIEF DESCRIPTION OF THE DRAWINGS

The invention will now be described in greater detail with reference to the accompanying drawings, wherein.

DETAILED DESCRIPTION OF THE DRAWING

Figure 1:
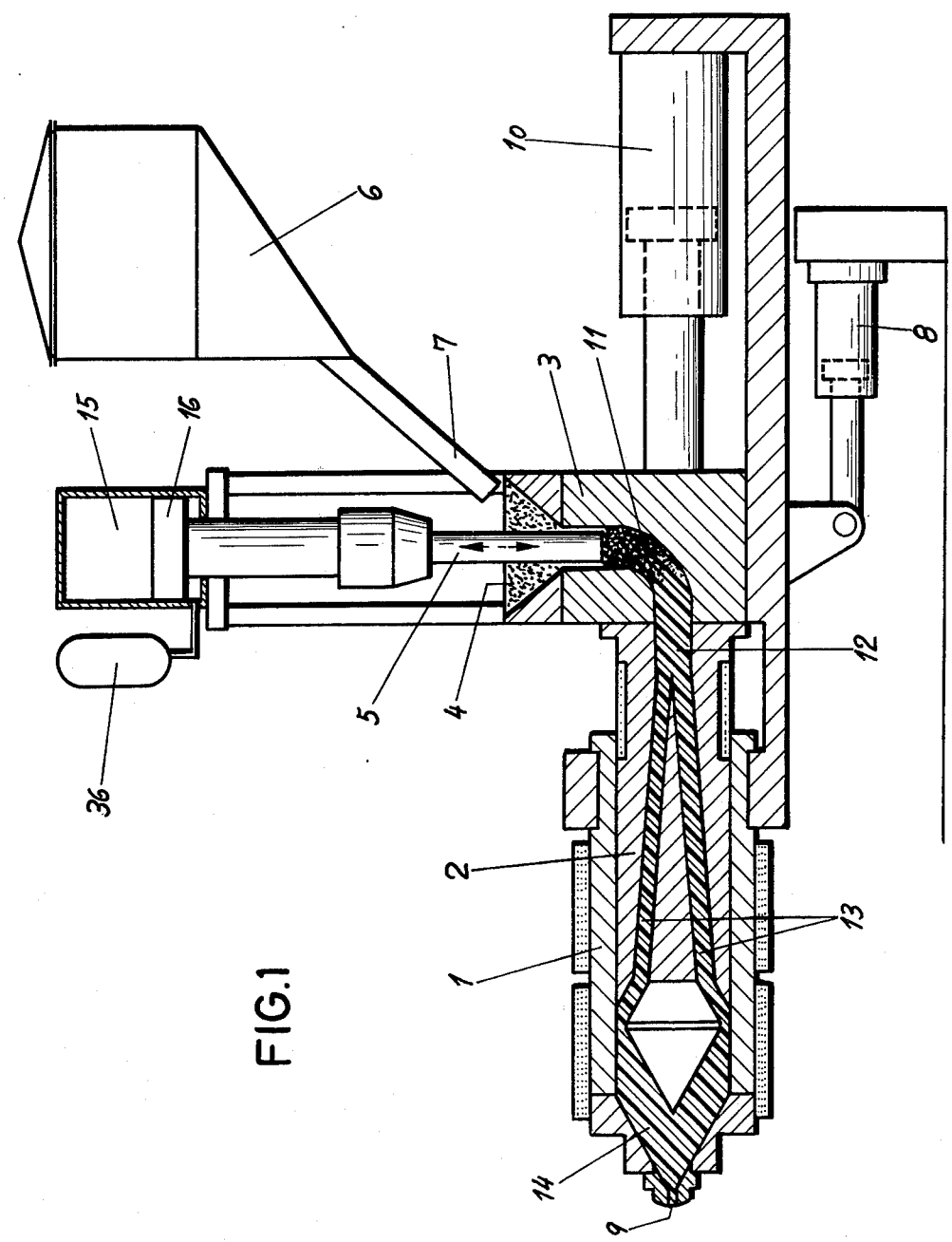
FIG. 1 is a schematic longitudinal sectional view of an injection molding machine in accordance with the invention.

Referring to FIG. 1, the injection molding machine includes a displacement element 2 slidably mounted in a heated injection cylinder 1 and connected at its outer end to a pressure block 3. A feed hopper 4, in which a hydraulically driven plunger 5 is reciprocally mounted, is mounted on the upper end of the pressure block 3. Plastic material is fed from a storage tank 6 to the feed hopper 4 via a chute 7.

The injection cylinder 1, the displacement element 2 and the feed device can be moved towards a fixed mold (not shown) by means of a hydraulic cylinder 8, whereby an injection nozzle 9 sealingly engages an injection orifice in the mold.

For injecting the material in the direction of the mold, the displacement element 2 and the feed device are moved with respect to the injection cylinder 1 by means of another hydraulic cylinder 10.

A quadrantal passage 11 is provided in the pressure block 3. The curvature of the passage commences at the position shown in the drawing, i.e., the lowest position of the plunger 5 and ends at a horizontal position. A concentric passage 12 is provided in the displacement element 2 at the inlet end of the displacement element. The passage 12 is divided into a number of diverging injection or feed ducts 13. The total of the individual cross-sectional area of the ducts 13 is substantially equal to the cross-sectional area of the passage 11 and of the concentric passage 12, so that sudden increases in pressure and sudden heating cannot occur in this area.

The material passing through the ducts 13 enters a retention chamber 14 before reaching the injection nozzle 9, from which the material is injected into the mold when the displacement element 2 moves forward while the injection cylinder is stationary.

The plunger 5 is actuated by means of a piston 16, which reciprocates in a cylinder 15. The pressure medium is fed into the cylinder 15 via a duct 17 (FIG. 2) using a pump 18, which draws the pressure medium from a reservoir 19. The pump 18 is driven by a motor 20. A check valve 21 and another check valve 22, with a stroke limiter, are provided in the duct 17. Moreover, a duct 23 extends from the same cylinder end (the top) to the reservoir 19 via yet another controlled check valve 24.

A pressure-adjustment valve 26, combined with a two-position valve 27, is disposed in a branch 25 of the feed duct 17. During change-over, pressure medium discharge from the pump 18 can flow to the reservoir 19 through the valve 27.

Another branch duct or line 28 leads to a piston reservoir 30, which is charged with pressure gas, and by means of which possible losses in pressure medium due to leaks or the like can be adjusted and the plunger 5 can be held in a lower final position when the pump is not in operation, as described hereafter in greater detail.

Figure 2:
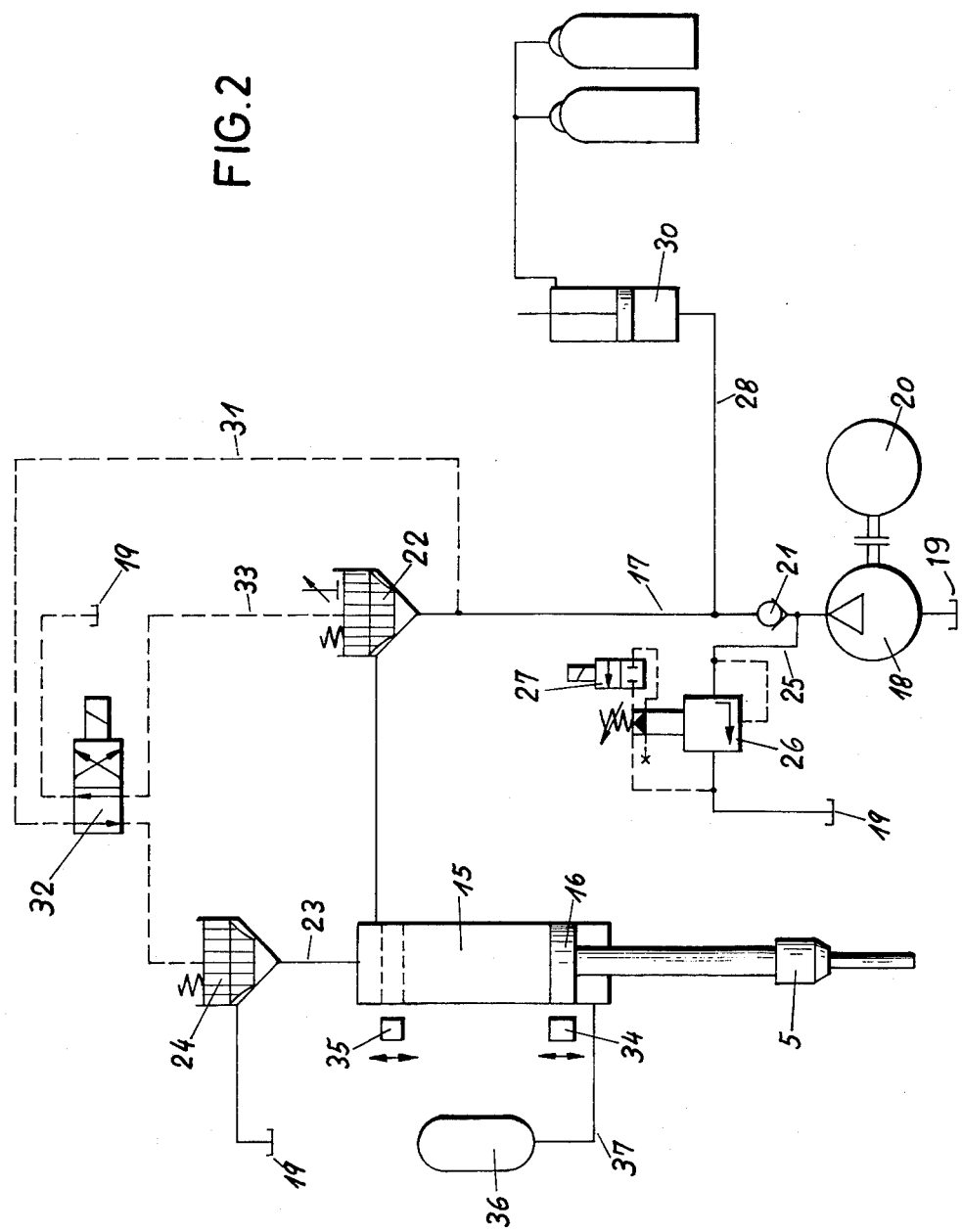
FIG. 2 is a schematic flow diagram of a hydraulic circuit for use with the machine of FIG. 1.

Another duct 31 connects the duct 17 before the controlled check valve 22, to a two-position valve 32 and, in the position shown in FIG. 2, the duct 31 extends to the controlled check valve 24 to keep the latter closed. An additional passage in the two-position valve 32 and a duct 33 establish fluid communication between the check valve 22 and the reservoir 19.

Two non-contact switches 34 and 35 are disposed adjacent the cylinder 15. Each of the switches is separately adjustable in the longitudinal direction of the cylinder. The switches 34 and 35 are so connected to the solenoid of the two-position valve 32 that they move the two-position valve 32 whenever the piston 16 approaches them. Moreover, the switches 34 and 35 are also connected to the solenoid of the two-position valve 27 in such a manner that the valve 27 is moved whenever the piston 16 approaches them.

A duct 37 connected to a hydraulic pressure reservoir 36 discharges into the piston rod end of the cylinder 15.

In operation, upon starting the pump 18, the pressure medium enters the cylinder 15 via the line 17 and moves the piston 16 with the plunger 5 downwardly, while the check valve 22 opens and the check valve 24 is kept closed. Upon reaching the position of the switch 34, the piston 16 releases a switching pulse, whereby the two-position valve 32 is moved to a position in which the check valve 22 closes and the check valve 24 opens. Thus, while the pressure medium in the cylinder is fed to the reservoir 19, the piston 16 is moved upwardly by the pressure medium in the pressure reservoir 36. At the same time, the two-position valve 27 is moved to a position in which the pressure medium conveyed by the pump is circulated without pressure via the pressure adjusting valve 26, the two-position valve 27 and the reservoir. When the piston 16 reaches the position of the upper switch 35, the two-position valves 27 and 32 are moved by corresponding control pulses, and the working cycle described above is repeated.

When, because of the number of strokes of the plunger 5, sufficient material enters the injection cylinder to fill the retention space 14, the two-position valve 32 is maintained in the position shown in FIG. 2 by a suitable electric switching operation, i.e., upon reaching the lowermost position of the piston, movement of the valve to the other position is prevented, so that the piston 16 is held in the lowermost position. This can also be effected by the piston reservoir 30 in the case of a malfunction of the pump 18. Upon injection of the material from the injection cylinder, the material is thus prevented from flowing back to the feed hopper 4 through the passage 11.

As will be apparent, the pressure in the system can be controlled by adjusting the pressure valve 26. Moreover, the extent of the working stroke of the piston 16 as well as the nul position and the operating position of the piston can be adjusted by altering the positions of the two switches 34 and 35. With the switching operation described, the stroke frequency is reciprocally changed as a function of the distance of the two switches 34 and 35 from each other and thus of the extent of the piston travel. Because of this development, it is possible to change the position of the working point of the plunger, the plunger stroke and frequency as well as the strength of the impacts, so that excellent adaptation to the injection material used in each case is possible, depending on the properties of the material, particularly viscosity and thermal conductivity.

Instead of the pressure reservoir 36, it is possible to use a piston directly acted upon on both sides by the pressure medium conveyed by the pump, i.e., a piston with a reserving valve.

I claim:

1. An injection molding machine for plastic material comprising an axially elongated injection cylinder, an axially extending displaceable element mounted in said injection cylinder with the axis of said displaceable element extending in the same direction as the axis of said injection cylinder, said displaceable element having an axially extending bore therethrough, one of said injection cylinder and displaceable element being axially movable relative to the other, said injection cylinder and displaceable element each having a first end and a second end with the first ends of each facing in the same direction and the second ends facing in the opposite direction from the first end, an injection nozzle positioned on the first end of said injection cylinder, a feed device located adjacent the second ends of said injection cylinder and displaceable element, said feed device including a feed hopper and a plunger reciprocally mounted in said feed hopper, means for conveying plastic material from said feed hopper into the bore at the second end of said displaceable element, pressure means in operative communication with said plunger for driving the reciprocating movement of said plunger, first switch means and second switch means spaced apart in the direction of the reciprocating movement of said plunger for reversing the movement thereof, said first and second switch means disposed in communication with said pressure means, said first and second switch means being selectively and separately positionable along the reciprocal path of movement of said plunger so that said first switch means defines the extent to which said plunger is inserted into said feed hopper and establishes the inserted position of said plunger and said second switch means defines the extent to which said plunger is retracted out of said feed hopper and establishes the retracted position of said plunger, and said pressure means including a device for retaining said plunger in the inserted position when a sufficient amount of plastic material has been supplied into the bore in said displaceable element for effecting the injection molding operation.

2. An injection molding machine, as set forth in claim 1, wherein said pressure means includes a pressure cylinder, a piston displaceable within said pressure cylinder and connected to said plunger for moving said plunger between the inserted and retracted positions, said pressure means also includes a two-position switch controlled by said first and second switch means for reversing the flow of pressure medium in said cylinder.

3. An injection molding machine, as set forth in claim 2, wherein a pressure medium reservoir is connected to said cylinder for supplying fluid for reversing the flow of the pressure medium.

4. An injection molding machine, as set forth in claim 2, wherein each of said first and second switch means comprises a switch located exteriorly of said cylinder and positioned in out of contact relation with said piston located in said cylinder.

* * * * *